Nov. 22, 1949     J. H. OWENS     2,488,927
VARIABLE BRIDGE TRANSDUCER AND ITS
COMBINATION WITH A RADIO RECEIVER
Filed March 10, 1945
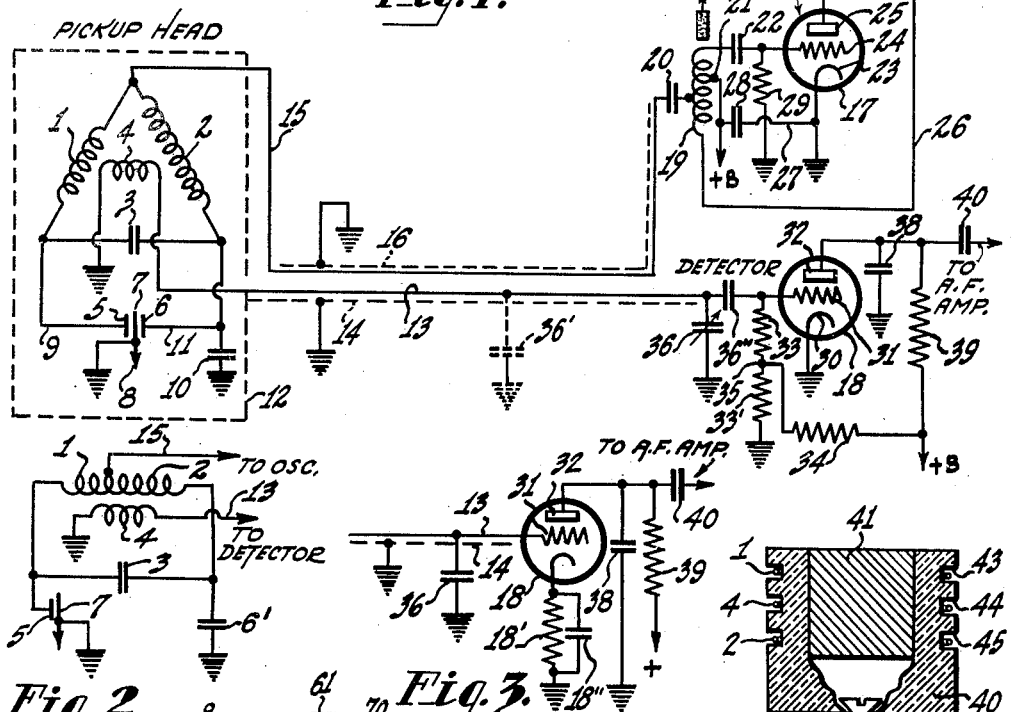
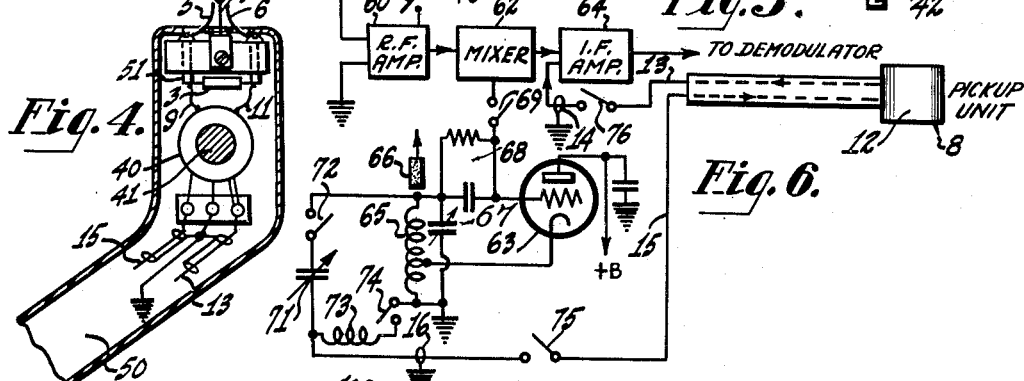
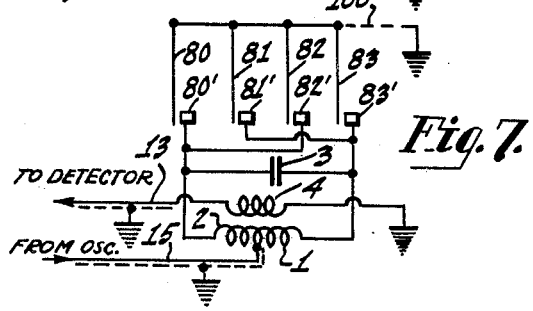
INVENTOR.
James H. Owens
BY
H. S. Grover
ATTORNEY Patented Nov. 22, 1949

2,488,927

UNITED STATES PATENT OFFICE 2,488,927

VARIABLE BRIDGE TRANSDUCER AND ITS COMBINATION WITH A RADIO RECEIVER

James H. Owens, Camden, N. J., assignor to Radio Corporation of America, a corporation of Delaware Application March 10, 1945, Serial No. 582,118

21 Claims. (Cl. 179—100.11)

My present invention relates generally to mechanico-electrical transducing systems, and more particularly to improved transducers of the type wherein dynamic capacity is utilized to modulate high frequency oscillations.

High frequency oscillations have been previously employed as a medium for translating mechanical energy into corresponding electrical energy, or vice versa. Additionally, both frequency and/or amplitude modulation of high frequency oscillations have been utilized in connection with phonograph or microphone transducer devices. In such prior arrangements dynamic capacity was used to shift the normal period of an oscillator relative to an associated discriminator, or to vary the impedance of a link circuit in the path of the oscillations on their way to a suitable detector. In known frequency modulation (FM) pickup circuits, adapted for phonographs or microphones, the dynamic capacity must be located close to the source of high frequency oscillations or to the variable impedance circuit, and the transmission line between the pickup unit and oscillation source or the variable impedance circuit, as the case may be, must have very low capacity and be non-microphonic. Being in parallel with the dynamic capacity, the line must have low capacity to prevent it from reducing the percentage of change that would be produced by a given change in dynamic capacity. The line must be non-microphonic, because any change in its capacity will produce a relatively large amount of modulation change as compared with the source of dynamic capacity.

It is, therefore, an important object of my present invention to provide a system wherein high frequency oscillator and detector components may be located remotely from a mechanico-electrical transducer unit, and the electrical connections between them may be small-size, relatively high-capacity lines without introducing appreciable losses in sensitivity.

Another important object of my present invention is to provide a highly improved record reproducing system, wherein the mechanico-electrical transducer unit is in the form of a bridge circuit whose components are physically located in the pickup head, or in the tone arm, and small-size, flexible, shielded cables run from the bridge circuit through the tone arm to a remotely located oscillator and detector unit.

Another important object of my invention is to provide a mechanico-electrical transducer system of the type utilizing a variable capacity pickup unit, adapted for use in connection with record reproducers, microphones, musical instruments of the vibrating reed or string types or rotary disc types, etc.; the system employing a normally unbalanced bridge circuit, energized by a source of high frequency oscillations, for supplying modulated high frequency oscillations to a detector in accordance with the degree of unbalance of the bridge circuit effected by operation of the pick-up unit.

Another object of my invention is to provide an improved variable capacity pickup unit capable of being applied to the local oscillator and intermediate frequency (I. F.) amplifier of a conventional superheterodyne receiver.

Still other objects of my invention are to provide a record reproducing system which has such advantageous characteristics as the following: tone arm and pickup head are not "hot," as would be the case if radio frequency standing waves existed in wiring in such members; negligible oscillator tube microphonics; insensitivity to static discharges in the record player mechanism and associated wiring; simplicity of adjustment since the bridge circuit is merely tuned for maximum audio output; cables that run from pickup head to oscillator and detector may be the same as used with magnetic pickups; wider range of linearity than an L-C resonance curve; high percentage of modulation provided; modulation products and even-order harmonics are cancelled out by use of push-pull pickup capacities; extraneous noise pickup relatively low even when a large amount of unshielded wiring is used; and sensitivity relatively high because of the low amount of static capacity in shunt with pickup capacity.

Still other objects of my invention are to provide lowered production cost; reduced size; simplicity of fabrication; and ease of servicing adjustments.

Still other features will best be understood by reference to the following description, taken in connection with the drawing, in which I have indicated diagrammatically several circuit organizations whereby my invention may be carried into effect.

In the drawing:

Fig. 1 shows a preferred embodiment of the invention;

Fig. 2 shows a modification of the pickup circuit;

Fig. 3 shows a modified detector;

Fig. 4 shows the manner of mounting the pickup unit components on the tone arm head;

Fig. 5 is a vertical section through the support form of the bridge coils;

Fig. 6 schematically illustrates a method of employing the pickup unit with the local oscillator of a superheterodyne receiver; and Fig. 7 schematically illustrates one method of applying the invention to an organ of the vibrating reed type.

Referring now to the accompanying drawings, wherein like reference numerals in the different figures denote similar circuit elements, I have shown in Fig. 1 an embodiment of my invention as applied to a record pickup system. The invention is in no way limited to the particular utilizations disclosed herein, since those skilled in the art will readily perceive many other uses to which my invention may be put. The rectangle 12, shown dotted in Fig. 1, is to be understood as symbolizing the pickup head of the tone arm of a record reproducer. In accordance with my invention, there is located at the head 12 a pair of inductive elements 1 and 2 of different inductance values. Elements 1 and 2 may be separate coils of different numbers of turns, or they may be of the same number of turns but of different inductance. Under certain conditions pointed out below, the inductances of elements 1 and 2 may be equal. The extreme ends of coils 1 and 2 are joined by a condenser 3 adapted to resonate coils 1 and 2 to a predetermined high frequency.

Coil 4 is magnetically coupled to coils 1, 2, and one end of coil 4 is grounded. The opposite end of coil 4 is connected to a conductor 13 of a shielded, flexible transmission line. Coil 4 is effectively shunted by condenser 36, the latter having one electrode coupled to conductor 13 and its other electrode grounded. Numeral 36' designates the inherent capacity (shown dotted) of conductor 13 to shield 14 which is grounded. Capacity 36' is in parallel with the capacity of condenser 36. Hence, the condensers 36 and 36' act to tune coil 4 to a frequency which may be that of circuit 1, 2, 3 or different therefrom.

The pickup needle or stylus 8 is schematically represented as being coupled mechanically to the mobile or vibratable electrode 7 of a push-pull condenser. The latter consists of one capacity provided by fixed electrode 5 and mobile electrode 7, and a second capacity provided by fixed electrode 6 and mobile electrode 7. Conductor 9 connects electrode 5 to the junction of coil 1 and condenser 3, while conductor 11 connects the electrode 6 to the junction of coil 2 and condenser 3. The mobile electrode 7 is grounded. A condenser 10 may be provided from the lead 11 to ground in parallel with condenser 7, 6. If coils 1 and 2 are of the same inductance, then the capacities 5, 7 and 7, 6 must be different, or the capacity 10 is placed in parallel with either capacity 5, 7 or 7, 6.

The junction of coils 1 and 2 is connected by conductor 15, shielded by grounded sheath 16, to a source of high frequency oscillations. Hence, high frequency oscillations are fed over conductor 15 to a bridge circuit whose arms consist of coils 1 and 2 and condensers 5, 7 and 7, 6. Coil 4 derives modulated high frequency energy from the bridge circuit, and feeds the energy to a detector circuit over conductor 13.

The high frequency oscillator may be of any suitable construction; my invention is in no way limited to the form of oscillator used. While I have shown separate triodes for the oscillator and detector tubes, it is to be clearly understood that the triode electrodes of the oscillator may be located in the same tube envelope as the detector triode electrodes. A twin triode tube, say of the 6SC7 type, could be used in that case. As shown, the cathode 23 of tube 17 is grounded, and control grid 24 is connected by direct current blocking condenser 22 to one end of tank coil 19. Grid 24 is returned to ground by grid leak resistor 29. The coil 19 may have an adjustable iron core for tuning to a desired high frequency.

Plate 25 is connected by conductor 26 to the other end of coil 19, and tap 21 on coil 19 is connected to a source of +B voltage. A second tap, preferably located between tap 21 and the plate end of coil 19, is connected through blocking condenser 20 to conductor 15. The sheath 16, flexible and grounded, and conductor 15 have inherent capacity therebetween which exists across part of the tank coil 19. This inherent capacity provides a fixed tuning capacity across coil 19. The cathode 23 being grounded, the +B tap 21 is ground for high frequencies by virtue of the connection of tap 21 to ground through condenser 28 and lead 27. Obviously when the section of coil 19 on one side of tap 21 is positive, the other section will be negative and vice versa. Hence, the circuit will support oscillations, because part of the plate circuit energy is delivered in proper phase to the grid 24.

It will be understood that oscillator 17 and its circuits may be located at a point remote from the tone arm and pick-up head 12, and that shielded, flexible line 15 feeds the oscillations to the junction of coils 1 and 2. The operating frequency of the oscillator should be above the highest frequency signal to be reproduced. It may be in the megacycle (mc.) range, or it may be in the kilocycle (kc.) range. For example, oscillator 17 may be tuned to a frequency as high as, or higher than, 20 mc., or as low as, or lower than, 175 kc.

The detector comprises triode 18 whose cathode 30 is grounded. The control grid 31 is connected by direct current blocking condenser 36" to conductor 13. The plate 32 of tube 18 is connected through resistor 39 to the +B terminal of the direct current source. The grid 31 is connected to ground by resistors 33, 33', and the point 35 at the junction thereof is connected by resistor 34 to the lower end of resistor 39. The plate 32 is bypassed by condenser 38 to ground for high frequencies. The audio frequency voltage developed across plate resistor 39 is transmitted by condenser 40 to a subsequent audio frequency amplifier and ultimate reproducer.

The tubes 17 and 18, or the twin triode tube if one is used, are located at a point of the instrument chassis removed from the tone arm. In other words the bridge circuit, located at the pickup head, or in the tone arm, is the only unit carried by the tone arm. The shielded, flexible conductors 13 and 15 are preferably run through the tone arm and the pivot and swivel joint to the oscillator and detector. Of course, any suitable detector may be employed in place of the one shown. For example, a diode rectifier may be utilized. The circuit shown illustrates a means for utilizing a low cost, single-cathode tube like the 6SC7, wherein one triode section is used as the oscillator, and the other as a detector.

In explaining the functioning of my novel system, it is to be understood that I prefer not to limit myself to a specific theoretical basis of operation. The circuit shown in Fig. 1 has been operated successfully, and the theoretical aspects of the following discussion are purely for purposes of explanation. The bridge circuit within rectangle 12 is normally unbalanced. Hence, any high frequency oscillations applied at the junction of coils 1 and 2 will induce in coil 4 a differential, or unbalance, current. This follows from the fact that the arm 2 of the bridge is of a larger inductance than arm 1. When the stylus 8 is immobile, or at its rest position, the electrode 7 is equally spaced from electrodes 5 and 6. Therefore, the field due to current flow through arm 1 opposes that due to current through arm 2. The differential field induces a current in coil 4 which is coupled to arms 1 and 2. This normal differential, or unbalance, current in coil 4 is caused to vary in magnitude by the displacement of electrode 7 in response to the motion of stylus 8.

If, for example, electrode 7 moves towards electrode 6, the impedance to ground from coil 2 is less. Hence, more current flows through coil 2. The result is to increase the unbalance current induced in coil 4. If, however, the electrode 7 moves towards electrode 5 the impedance to ground from coil 1 is decreased, and the current through coil 1 increases while that through coil 2 decreases. This results in a reduction of the magnitude of unbalance current induced in coil 4 below the normal value. Hence, as the stylus 8 is vibrated due to scanning the grooves of the phonograph record, the electrode 7 vibrates correspondingly. The result is to modulate the amplitude of the normal unbalance current induced in coil 4 in correspondence with the vibration of stylus 8.

The amplitude modulated high frequency energy is transmitted over conductor 13 to the grid 31 of the grid leak detector tube 18. There it is rectified or detected in the usual manner except that the reference potential of the grid return has been shifted from ground potential by resistor 34 to a point which is more positive than ground. The effect of this is a reduction of the average negative bias which is produced by the flow of grid current, and a consequent increase in the sensitivity of the tube to amplify the small audio component of the modulated carrier current. The use of a positive reference potential serves to locate the averages negative grid bias potential near the center of the straight line portion of the grid voltage-plate current curve when the incoming high frequency voltage is high. As stated before, any other suitable form of detector may be used, as, for instance, a diode rectifier.

In Fig. 3 I have shown another type of detector which has merit. The plate circuit detector illustrated in Fig. 3 is biased to a point near cut-off by a resistor 18' between the cathode and ground. Cathode resistor 18' has higher resistance, as compared with the cathode resistor that would normally be used with the same tube as a class A amplifier, thereby providing greater negative grid bias. This resistor 18' is by-passed with a condenser 18'' so that degeneration does not occur in the desired audio frequency band. At very low frequencies, say those below 30 cycles, the condenser value chosen has a rising impedance. Therefore, it does not efficiently by-pass these low audio impulses. Degeneration then occurs, and, because of the high resistance of the cathode resistor 18', is large enough to provide substantially a low frequency cut-off, i. e., a high-pass filter effect.

It will be found practically impossible completely to shield the detector from the oscillator in a production model. Therefore, some high frequency energy will usually be transmitted around the bridge, because of stray coupling effects. The phase of this stray energy will never be exactly in phase, or exactly 180 degrees out of phase, with the energy transmitted through the bridge. However, coil 4 can be constructed and arranged so that it will pass energy which will either oppose or reinforce the energy arriving at the detector by way of stray coupling. This stray energy can be utilized without disadvantage, as will now be shown.

As was previously explained, the bridge circuit preferably is normally unbalanced, and the unbalance is accomplished by making the two inductive arms of the bridge unequal in reactance. As illustrated in Fig. 1, coil 2 has a greater inductance than coil 1. Therefore, capacitor 6, 7 will have a greater modulating effect than capacitor 5, 7. When capacitor 10 is connected in parallel with capacitor 6, 7 it lowers the effectiveness of capacitor 6, 7, and also increases the degree of bridge unbalance. The proper choice of relative inductance between coil 1 and coil 2, plus the proper choice of relative reactance between capacitor 5, 7 plus capacitor 10, will provide a desirable condition of unbalance where a given change in the value of capacitor 5, 7 will produce a modulating effect substantially equal to that which will be produced by the same amount of change in capacitor 6, 7.

The bridge must be unbalanced sufficiently so that the maximum movement of the stylus 8 will not produce more than 100% modulation of the unbalance or differential currents. If a margin of safety is desired, the maximum percentage of modulation should never approach 100%. Suppose that the bridge unbalance current produces a potential of 0.05 volt at the rectifier, and that the maximum increase of capacity 6, 7 caused this voltage to rise to 0.08 volt. Assume, now, that the maximum increase in capacity 5, 7 caused this voltage to drop to 0.02 volt, then the maximum excursion of stylus 8 would produce 60% modulation, which is a desirable level.

The presence of stray pickup energy at the detector will prevent the existence of a condition exactly as described in the preceding paragraph. This stray pickup could, for example, produce a potential of 0.2 volt at the detector. With this value of stray pickup, the percentage modulation can still be 60%, provided that the bridge is further unbalanced, by readjustment of coil 2 with respect to coil 1, and/or by readjustment of capacitor 10 plus capacity 6, 7 with respect to condenser 5, 7, so that the unbalance current is strong enough to reduce the potential at the detector to .05 volt again. This requires coil 4 to be in a direction that allows the phase of the bridge unbalance differential current to oppose the stray pickup currents. Obviously, if the phase difference was exactly 180 degrees, the bridge currents would have to produce a potential of 0.15 volt to accomplish the desired results. To cite another example, substantially the same results would occur if the bridge were to be unbalanced to an extent where the bridge unbalance currents produce a potential of 0.25 volt at the detector. (Consider, again, a phase difference of exactly 180 degrees.) This would cancel completely the 0.2 volt produced by strays, leaving .05 volt to be modulated as before.

Theoretically, the bridge could be perfectly balanced, and still produce good results. If the stray pickup were to be adjusted so that it would produce a small voltage at the detector, then when the pickup stylus or armature 8 moves capacitor member 7 in one direction, the bridge would become unbalanced and the differential currents would be aiding in phase to the stray currents, and the potential at the detector would be increased. When the pickup armature moves the capacitor member 7 in the other direction, the bridge again becomes unbalanced, but the differential currents are opposing in phase to the stray currents, and the potential at the detector is decreased. This mode of operation, however, is relatively difficult to adjust, unstable, and not linear.

The bridge circuits (comprising coils 1, 2 and capacitor 3 together with coil 4 and capacitor 36) are preferably overcoupled beyond the point of critical coupling. In this condition, the overall response curve is broad enough to include the oscillator frequency even when coils 1 and 2 and capacitor 3 by themselves would tune to a frequency considerably removed from the oscillator frequency. This allows the use of fixed value, commercial quality components for component parts 1, 2, 3, and 4, which have fairly broad tolerances. The overall response curve is very broad, with a peak at each end. In practice, either one of the peaks preferably corresponds to the oscillator frequency. If the bridge circuits are critically coupled, or loosely coupled, it is desirable that both capacitors 3 and 36 be variable, so that both of the bridge circuits can be tuned to the oscillator frequency. The same result could be accomplished by making coils 1, 2, and 4 so that their inductances could be varied, but this is not considered so expedient as making the capacitors variable.

Shielded transmission lines 13 and 15 are of relatively low impedance, and they can be run a considerable distance without ill effects. The lower the oscillator frequency, the longer the cables may be and the higher the magnitude of capacity between the transmission lines and ground which can be tolerated. Any tendency towards microphonics is reduced by virtue of the high capacity transmission lines. The latter are preferably small-size, flexible, relatively high-capacity, shielded cables running the full length of the tone arm through the usual swivel joint.

Considering, now, more specific design features of the system shown in Fig. 1, I prefer to use a high L/C ratio for circuit 1, 2, 3. The factor which limits the number of turns in coils 1 and 2 is the distributed capacity between turns in each coil. The L/C ratio should not be so high as to permit the distributed capacity to have a detrimental effect. The reason for the high L/C ratio is that a given capacity change in 5, 7 and 7, 6 will produce a greater voltage drop across coils 1 and 2 when these coils are large.

The L/C ratio can be increased without any ill effects by using a high "Q" synthetic magnetite core inside of coils 1 and 2. Since the distributed capacity to ground should be kept as low as possible, the core should not be grounded. In Fig. 5 I have shown such a construction for the bridge coils. The figure shows a vertical mid-section through a hollow polystyrene form 40 having a magnetite core 41. The bottom of the bore is provided with a securing plate 42 adapted to affix the form to the head of the tone arm. The circular grooves 43, 44, 45 are provided to receive the bridge coils. Coil 4 may be wound in center groove 44, or in either of the outer grooves. All three coils are random wound in the grooves. Tests have shown that the mutual between coils 1, 2 and 4 should be as high as possible, but that the capacitative coupling should be kept low. The use of the magnetite core 41 improves the mutual without materially increasing the capacitative coupling.

One particular embodiment of the invention used an oscillator frequency of about 10 mc., the oscillator triode (which was a triode section of a 6SL7-GT) drawing 4 milliamperes at +250 volts.

The detector output was 2 volts, as compared with about 0.75 volt from a high output, low-noise, piezo-electric crystal pickup. Coil 1 had 5 turns, coil 2 had 7 turns, and coil 4 had 7 turns. Condenser 3 was 40 mmf. (micro-microfarads), and the effective shunt capacity across coil 4 was 60 mmf. total.

In Fig. 4 I have shown one method of mounting the components in the pickup head. It will be understood that in Fig. 4 the tone arm is being viewed from the under-face thereof. The tone arm 50 is only partially shown, and is usually a channel provided with a free end which functions as the housing for the pickup elements. It will be noted that the form 40 is affixed to the casing. The transmission line 15 and the transmission line 13 are both run to the respective coils wound on form 40. The transmission lines are shown as being shielded. The leads 9 and 11 are indicated as running from the form 40, and from the ends of coils 1 and 2 (as indicated in Fig. 1) to the opposite terminals of the fixed condenser 3. The condenser may be fixedly connected between the metallic bolts 51. The push-pull pickup condenser itself may be of the type disclosed by A. Badmaieff in U. S. Patent No. 2,371,373, granted March 13, 1945. Specific reference is made to Figs. 6 to 9 inclusive of that patent which show the specific construction of the pickup device.

The fixed electrodes 5 and 6 may be secured to the heads of the spaced bolts 51, while the mobile electrodes 7 is secured midway between the free ends of electrodes 5 and 6. The free end of electrode 7 is provided with the stylus 8. It will now be observed that in the present construction the normally unbalanced bridge is completely removed from the oscillator and detector circuits. The effect of the vibration of electrode 7 is to vary the degree of unbalance of the bridge. Hence, the leads which bring the power to the bridge and transmit the modulated current from the bridge do not pick up disturbances, and are not affected by the proximity of variable objects.

The invention is not restricted to the use of a push-pull condenser as a pickup device. In Fig. 2 I have shown a modification wherein one of the pickup condensers is omitted, and is replaced by a fixed condenser 6'. The electrode 7 varies the capacity of condenser 5, 7, and, hence, there is only one source of dynamic capacity. The condenser 6' is connected from condenser 3 to ground, and serves to fix the amount of unbalance current in the bridge when member 7 is immobile. The variation of the position of electrode 7 will vary the unbalance current flowing through coil 4 by virtue of the variation of impedance of the path to ground through condenser 5, 7. Since the pickup in this case is single-ended, there is no cancellation of modulation products and even order harmonics, as would be the case with the push-pull pickup.

Since a radio receiver of the superheterodyne type embodies a local oscillator tunable to a constant or fixed frequency, my pickup unit may readily be applied to any suitable broadcast receiver of the superheterodyne type thereby providing a novel form of radio-phonograph combination. In general, it is only necessary to disconnect the local oscillator from the mixer stage, and to adjust the oscillator to a constant frequency substantially equal to the intermediate frequency (I. F.) value. When this adjustment has been made the oscillator feeds oscillations of I. F. value to the unbalanced pickup bridge circuit, and the modulated oscillations are then transmitted to the input circuit of the I. F. amplifier, after which the amplified oscillations are detected by the existing demodulator of the receiver.

In Fig. 6 I have shown a radio-phonograph system embodying my invention. The receiver has been shown schematically, since those skilled in the art of radio communication will fully understand the construction thereof. Assuming that the receiver is a superheterodyne receiver operating in the 550–1600 kc. band, it will generally comprise a radio frequency amplifier 60 having the usual signal collector 61. The radio frequency amplifier 60 feeds the amplified selected signals to a mixer 62. An oscillator tube 63 provides the local oscillations which beat with the signals applied to the mixer electrodes. The I. F. output energy of mixer 62 is applied to the I. F. amplifier 64. It is assumed that the I. F. amplifier 64 comprises one or more selective stages of I. F. amplification. The operating I. F. value may be 455 kc., by way of example.

The amplified I. F. energy is then transmitted to any desired form of demodulator. For example, the latter may be a diode rectifier, or a detector such as shown in Fig. 1. The circuit details of the oscillator tube are shown, because certain of the oscillator components are utilized with the pickup unit when the receiver function is dispensed with. The oscillator may be of any suitable type, and is shown specifically as including a tank circuit coil 65 provided with an iron core 66. My invention is not limited to the specific oscillator circuit. The tank coil shown is shunted by condenser 67, and normally during receiver operation tank circuit 65, 67 is tuned over a range of local oscillation frequencies differing from the range of signal frequencies by the I. F. value.

The cathode of tube 63 is connected to an intermediate tap on coil 65, and the control grid of the tube is connected to the ungrounded side of the tank circuit through the usual resistor-condenser network 68. The plate of tube 63 is connected to a suitable +B voltage source, and the energizing lead is bypassed to ground for high frequencies. In order to disconnect the oscillator from the mixer 62 a switch 69 is provided in the usual coupling connection to the mixer. Furthermore, a switch 70 is provided in the +B line to the radio frequency amplifier 60. When switches 69 and 70 are open there will be no high frequency energy developed in the output circuit of mixer 62. These switches are open during phonograph operation.

The coil 65 is shunted by a trimmer condenser 71 in series with switch 72, trimmer inductance 73 and switch 74. Switch 74 is located between one end of inductance 73 and the grounded side of tank circuit 65, 67. The switches 72 and 74 are closed for phonograph operation, and are open during receiver operation. The transmission line 15 is connected to the junction of coil 73 and condenser 71 through a switch 75. Numeral 16 indicates the grounded shielding of the line 15. The line 13, the shielding 14 being symbolically represented as in the case of shielding 16, is connected to the input grid of the first I. F. amplifier by switch 76. The switches 75 and 76 are closed for phonograph operation.

The tone arm head 12, whose stylus 8 is shown in Fig. 6, is to be understood as including the components of the unbalanced bridge circuit. In other words, the elements shown in rectangle 12 of Fig. 1 are to be understood as being included within the casing or head 12 of Fig. 6. The cables 13 and 15 run along the tone arm and through the pivot and swivel joint. A common actuating device of suitable construction may be employed concurrently to open switches 70 and 69, and close switches 72, 74, 75 and 76 for phonograph operation. In the system of Fig. 6 the closing of switches 72 and 74 results in the condenser 71 and inductance 73 tuning the tank circuit to the lower peak frequency of the response curve of the bridge circuit, e. g., close to 455 kc. It is not necessary to tune coil 4 of the bridge circuit in Fig. 6. If desired, the coil 4 could be connected directly to the first amplifier grid of the I. F. network 64. Of course, the circuit 1, 2, 3 in the bridge would be tuned to 455 kc. in that case.

The invention is applicable to an electric organ, piano or electronic chimes. In Fig. 7 by way of specific example, I have shown a reed organ which is of the electrically operated type. Since the invention does not reside in the construction of the reed organ per se, only the reeds thereof are shown. Further, a restricted number of reeds are shown, since it will be readily understood that as many reeds as desired may be employed. Assume that each of reeds 80, 81, 82 and 83 are grounded at the fixed ends thereof, and that each reed has a means for vibrating it at a predetermined period. The vibrating means is usually air pressure. Each reed has its free end spaced normally from a fixed condenser plate. Thus, electrodes or plates 80', 81', 82' and 83' are associated with each of reeds 80, 81, 82 and 83 respectively.

Electrodes 80' and 82' are connected in parallel to one side of tuned circuit 1, 2, 3 of the bridge circuit, while electrodes 81' and 83' are connected in parallel to the opposite side of the tuned circuit. Of course, the bridge circuit per se is exactly the same as in Fig. 1. The oscillator feeds its ouput energy over line 15 to the junction of coils 1 and 2. The amplitude modulated high frequency unbalance current is fed from coil 4 over line 13 to a detector. The action of the paralleled condensers is the same as in Fig. 1. That is, condenser 80, 80' and condenser 82, 82' are connected in parallel to ground from one side of the tuned circuit 1, 2, 3. Condensers 81, 81' and 83, 83' are in parallel from the other side of circuit 1, 2, 3 to ground. Hence, as the capacity to ground on each side of tuned circuit 1, 2, 3 varies, the value of unbalance current flowing through coil 4 varies responsively. Of course, as many additional reeds and respective spaced fixed electrodes may be employed as is desired. The additional reeds will connect to ground line 100, while the associated fixed electrodes thereof will connect in alternate manner to opposite sides of circuit 1, 2, 3. This pickup action is push-pull in this case, and extraneous noise pickup is greatly reduced. This is important in this utilization since a large amount of unshielded wiring may be used, and any extraneous noise picked up by the reeds or wiring on one side of coils 1, 2, 3 will be cancelled out by a like amount of pickup on the other side which is 180° out of phase. By employing a relatively low frequency source as the oscillator (say 175 kc.) radiation is substantially minimized.

While I have shown and described preferred embodiments of my invention, it will be understood that various modifications and changes will occur to those skilled in the art without departing from the spirit and scope of this invention. I therefore contemplate by the appended claims to cover any such modifications as fall within the true spirit and scope of my invention.

What I claim is:

1. In an electro-transducer system, an unbalanced bridge circuit, a high frequency current source remote from the bridge circuit, a transmission line connected for feeding current from the source to said bridge circuit, a reactive element coupled to said bridge circuit to derive unbalance current therefrom, transducer structure forming part of the bridge circuit and connected for varying the amplitude of said unbalance current in accordance with transducer variations, and a second transmission line connected for feeding the amplitude-variable unbalance current from the reactive element to a remote utilization point.

2. In an electro-transducer system, an unbalanced bridge circuit, a high frequency current source remote from the bridge circuit, a transmission line including grounded high capacity shielding connected for feeding current from the source to said bridge circuit, a reactive element coupled to said bridge circuit to derive unbalance current therefrom, transducer structure forming part of the bridge circuit and connected for varying amplitude of said unbalance current in accordance with transducer variations, and a second transmission line including grounded high capacity shielding connected for feeding the amplitude-variable unbalance current from the reactive element to a remote utilization point.

3. In an electro-transducer system, an unbalanced bridge circuit, a high frequency current source remote from the bridge circuit, a transmission line connected for feeding current from the source to said bridge circuit, a reactive element coupled to said bridge circuit to derive unbalance current therefrom, a transducer operatively associated with the bridge circuit and adapted to vary the amplitude of said unbalance current, and a second transmission line connected for feeding the amplitude variable unbalance current from the reactive element to a remote detector.

4. In an electro-transducer system, an unbalanced bridge circuit, a high frequency current source remote from the bridge circuit, a transmission line connected for feeding current from the source to said bridge circuit, a reactive element coupled to said bridge circuit to derive unbalance current therefrom, transducer structure forming part of the bridge circuit and connected for varying the amplitude of said unbalance current in accordance with transducer variations, and a second transmission line connected for feeding the amplitude-variable unbalance current from the reactive element to a remote utilization point, said transducer structure consisting essentially of a pair of condensers in push-pull provided with a common vibratable electrode.

5. In combination, a source of high frequency oscillations, a bridge circuit having a pair of inductive arms and a pair of capacitive arms, a third inductance magnetically coupled to the inductive arms for deriving unbalance current from the bridge circuit, said two capacitive arms having a common mobile electrode for varying the unbalance current, and means for translating the variable unbalance current.

6. In combination with the local oscillator and intermediate frequency amplifier of a superheterodyne receiver, a normally unbalanced bridge circuit, means for adjusting said oscillator to produce oscillations of the intermediate frequency of said receiver, means for applying said oscillations to said bridge circuit, transducer structure included in said bridge circuit and having a mobile electrode for varying the degree of unbalance of the bridge circuit in accordance with transducer variations, means coupled to said bridge circuit for deriving therefrom an amplitude-variable unbalance current, and means for feeding said last current to said intermediate frequency amplifier.

7. In combination, a bridge circuit, a high frequency oscillation source remote from the bridge circuit, a transmission line connected for feeding oscillations from the source to said bridge circuit unbalancing means connected to the bridge circuit for unbalancing it, a reactive element coupled to said bridge circuit to derive unbalance current therefrom, transducer structure electrically connected in the bridge circuit adapted for varying the amplitude of said unbalance current in accordance with transducer variations, and a second transmission line connected for feeding the amplitude-variable unbalance current from the reactive element to a remote utilization point.

8. In a record reproducer system, an unbalanced bridge circuit, a current source remote from the bridge circuit, a high capacity transmission line connected for feeding current from the source to said bridge circuit, a reactive element coupled to said bridge circuit to derive unbalance current therefrom, a capacitative transducer connected in the bridge circuit for varying the amplitude of said unbalance current in accordance with transducer variations, and a second transmission line connected for feeding the amplitude-variable unbalance current from the reactive element to a remote utilization point.

9. In an electro-transducer system, an unbalanced bridge circuit, a high frequency current source remote from the bridge circuit, a transmission line connected for feeding current from the source to said bridge circuit, a coil coupled to said bridge circuit to derive unbalance current therefrom, transducer structure consisting of a pair of condensers in push-pull relation connected in the bridge circuit for varying the amplitude of said unbalance current in accordance with transducer variations, and means for feeding the amplitude-variable unbalance current from the coil to a remote detector.

10. In an electro-transducer system, an unbalanced bridge circuit, a current source, a transmission line connected for feeding current from said source to said bridge circuit, a reactive element coupled to said bridge circuit to derive unbalance current therefrom, transducer structure connected in the bridge circuit for varying the amplitude of said unbalance current in accordance with transducer variations, means for feeding the amplitude-variable unbalance current from the reactive element to a utilization point, said transducer structure consisting of push-pull condensers provided with a common vibratable electrode.

11. In combination, a source of high frequency oscillations, a normally unbalanced bridge circuit having a pair of inductive arms and a pair of variable capacitances arms, an inductance coupled to the inductive arms for deriving unbalance current from the bridge, said capacitances being connected for varying the unbalance of said bridge circuit in response to relative variation of the capacitances, and means for translating the variable unbalance current.

12. In combination with the local oscillator, intermediate frequency amplifier and detector of a superheterodyne receiver, a normally unbalanced bridge circuit, means for adjusting said oscillator to produce oscillations of intermediate frequency, means for feeding said oscillations to said bridge circuit, a transducer included as an element of said bridge circuit and having a mobile electrode for varying the degree of unbalance of the bridge circuit, means coupled to said bridge circuit for deriving therefrom an amplitude-variable unbalance current, and means for feeding said last current to said detector through said intermediate frequency amplifier.

13. In a mechano-electric signal transducer system for converting mechanical signal variations into corresponding electric current variations: a bridge network having four reactive impedance arms two of which are inductance arms tuned to resonate at the same frequency, at least one of the bridge arms comprising a variable unbalance element responsive to mechanical signals to be transduced for correspondingly varying the impedance of that arm; constant frequency current supply means connected to the bridge for passing electric currents having said resonating frequency through the bridge arms; and detector elements linked with the bridge for detecting amplitude modulation of bridge unbalance current caused by the variation of said variable element, and connected for delivering electric currents corresponding to the signals.

14. The combination as defined by claim 13 in which the bridge arms are unbalanced when the unbalance element is at rest.

15. The combination as defined by claim 13 in which the current supply means is a source of alternating electric currents having a frequency higher than the highest signal frequency to be transduced; the tuned inductance arms are adjacent arms of the bridge; and the current supply means includes two current supply leads, one of which is connected to the bridge between said inductance arms, and the other of which is connected to the bridge between the remaining two arms.

16. The combination as defined by claim 15 in which the detector elements include an inductance magnetically linked with the bridge inductances for developing voltages corresponding to modulation of the bridge currents.

17. The combination as defined by claim 16 in which the detector inductance is tuned to resonate at approximately the same frequency as the bridge inductances and the magnetic linkage overcouples the detector inductance with the bridge inductances and provides the detector elements with a broad frequency response.

18. The combination as defined by claim 13 in which the bridge arms are unbalanced when the unbalance element is at rest, and in which the current supply means is a source of alternating electric currents having a frequency higher than the highest signal frequency to be transduced; the tuned inductance arms are adjacent arms of the bridge; the variable element is connected as the junction of the other arms; and the current supply means has two current supply leads, one of which is connected to the bridge between said inductance arms, and the other of which is a grounded current return conductor connected to the variable bridge element.

19. The combination as defined by claim 13 and further including a phonograph tone arm, the variable bridge element being mounted on said arm as part of a phonograph pickup assembly, the current supply means including a current source remote from the tone arm, the detector elements including demodulator means remote from the tone arm and unbalance-current response elements connected to the demodulator means for supplying to said demodulator means signals corresponding to variations in bridge unbalance currents, the current source and demodulator means being connected with the bridge through a set of elongated conductors and the only portions of the system held on the tone arm are the bridge network, the unbalance-current response elements and a section of the elongated conductors.

20. In a combined heterodyne receiver of amplitude-modulated signals and mechano-electric transducer of mechanical signals: signal receiving elements for receiving incoming modulated signals; heterodyne elements including oscillator means for generating waves to heterodyne with the incoming modulated signals and form beat signals in a fixed intermediate frequency band; amplification means connected to the heterodyne elements for amplifying the beat signals; demodulator elements connected to the amplification means for demodulating the amplified beat signals; a bridge network having four reactive impedance arms two of which are inductance arms tuned to resonate at a frequency within said intermediate frequency band, at least one bridge arm including a variable unbalance element responsive to mechanical signals to be transduced for correspondingly varying the impedance of that arm; unbalance-current response elements linked to the bridge to supply electrical signals corresponding to variations in bridge unbalance currents; selectable switch means connected for selectable actuation between two positions in one of which it causes the oscillator means to shift the generated wave frequency into the intermediate frequency band and pass the generated waves through the bridge network, and also connects the unbalance-current response elements to the amplification means for amplifying said electrical signals and causing these amplified signals to be demodulated by the demodulator elements.

21. The combination as defined by claim 13 in which the detector elements include an inductance magnetically linked with the bridge inductances for developing voltages corresponding to modulation of the bridge unbalance currents.

JAMES H. OWENS.

REFERENCES CITED

The following references are of record in the file of this patent:

UNITED STATES PATENTS

| Number | Name | Date |
|---|---|---|
| 1,677,806 | Weinberger | July 17, 1928 |
| 1,732,393 | Andrews | Oct. 22, 1929 |
| 2,019,481 | Applegate | Nov. 5, 1935 |
| 2,045,107 | Shore | June 23, 1936 |
| 2,169,859 | Usselman | Aug. 15, 1939 |
| 2,361,634 | Koch | Oct. 31, 1944 |
| 2,371,373 | Badmaieff | Mar. 13, 1945 |
| 2,378,819 | Albright | June 19, 1945 |
| 2,395,390 | Antalek | Feb. 26, 1946 |